(No Model.)
F. A. WOODHEAD.
WARP THREAD OPERATING MECHANISM FOR LOOMS.
No. 510,752. Patented Dec. 12, 1893.
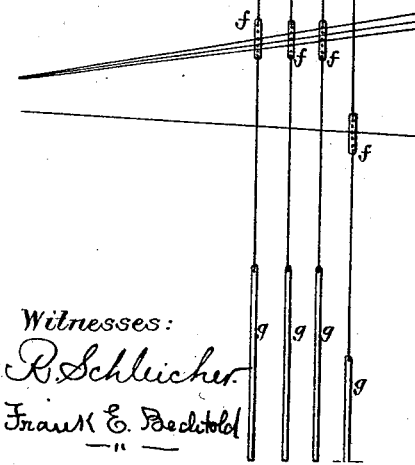
*Witnesses:*
R. Schleicher
Frank E. Bechtold
*Inventor:*
Frank A. Woodhead
by his Attorneys
Howson & Howson
THE NATIONAL LITHOGRAPHING COMPANY,
WASHINGTON, D. C.

UNITED STATES PATENT OFFICE.

FRANK A. WOODHEAD, OF PHILADELPHIA, PENNSYLVANIA, ASSIGNOR OF ONE-HALF TO THOMAS HATTON, OF SAME PLACE.

WARP-THREAD-OPERATING MECHANISM FOR LOOMS.

SPECIFICATION forming part of Letters Patent No. 510,752, dated December 12, 1893.

Application filed April 10, 1893. Serial No. 469,708. (No model.)

*To all whom it may concern:*

Be it known that I, FRANK A. WOODHEAD, a subject of the Queen of Great Britain and Ireland, and a resident of Philadelphia, Pennsylvania, have invented certain Improvements in Warp-Thread-Operating Mechanism for Looms, of which the following is a specification.

The object of my invention is to so construct and combine the Jacquard lifters, harness cords and shafts or journals of a loom that either of the harness cords controlled by a lifter hook of the jacquard can be depressed by its journal when the hook is lifted, as well as lifted by the journal when the hook is down, and this object I attain in the manner hereinafter set forth.

In the accompanying drawings:—Figure 1, is a diagram illustrating my invention. Fig. 2, is an enlarged view illustrating a special part of the harness to which my invention relates. Figs. 3 and 4, are detached views of an element of this part of the harness; and Fig. 5, is a view similar to Fig. 1, but illustrating a modification of my invention.

In Fig. 1, A represents an ordinary form of Jacquard hook or lifter having a depending tail $a$ to which is connected a series of harness cords $b$, four of such cords being shown in the present instance, and each of these cords passing through an opening in a comber board $d$ and having in the depending portion below the latter a mail $f$ for the passage of the warp thread, and a lingo or weight $g$ at the lower end for pulling down the harness cord and keeping it under proper tension. Each of the harness cords also passes through an opening in a shaft or journal $h$ and has both above and below said journal a knot or other enlargement $x$ for a purpose described hereinafter.

Instead of being connected directly to the depending tail $a$ of the lifter hook A each of the harness cords $b$ is connected to said tail by means of an elastic strap, loop, or cord $i$, preferably consisting of a rubber strip connected at its opposite ends to combined spring clips and eyes $m$ such as shown in Figs. 3 and 4, each of these eyes being split and having projecting wings $m'$ so that on pulling these wings apart they will be opened for the reception of the end of the strip and can then be allowed to close so as to engage with and retain said strip.

By reason of the elastic connections between the tail $a$ and cords $b$, each of these cords can be depressed while the hook or lifter A is elevated. Hence by a proper operation of the journals $h$ I can depress any of the cords while permitting the lift of the other cords by means of the hook, for instance, supposing that the cylinder of the Jacquard machine was only turned once for every four picks, each of the hooks which will be permitted by the card to engage with the griff bar of the jacquard would be lifted four times in succession and the harness cords connected to said hook would be correspondingly lifted, but, by depressing the journals $h$ successively each of the harness cords in succession could be caused to remain down for one pick so as to carry a tying warp to the back of the fabric, all of the other threads of the set being lifted so as to appear upon the surface. In like manner, when the hook A is permitted to remain down the harness cords can be lifted in succession by the engagement of the journals with the upper knots or enlargements on said cords as usual.

The journals may be operated by cams in the usual manner, or by special lifter hooks of the Jacquard mechanism, and they may be operated independently or in pairs, one ascending as the other descends, this being immaterial to my invention. I may also, when the journals are arranged in pairs, use one as a counterbalance for the other, and thus dispense with the elastic connections, and yet permit the depression of either of the warp threads independently of the lifter hook and its tail. For instance, in the construction shown in Fig. 5 there are two pairs of journals $h'$ $h'$ and $h^2$ $h^2$, the journals $h'$ being suspended from the opposite ends of a cord $i'$ which passes over a pulley $i^2$ on the harness tail, and the journals $h^2$ being likewise suspended.

When the hook A is down, either harness cord can be lifted by a lift of its journal, the cord $i'$ being slackened, and when the hook A is raised, either harness cord can be depressed by the depression of its journal, the other journal of the pair rising and lifting its harness cord and warp thread so as to serve as a counterbalance for the depressed journal.

Having thus described my invention, I claim and desire to secure by Letters Patent—

1. The combination of the lifter hook, the series of harness cords each having a yielding connection with said lifter hook, and journals engaging with said harness cords, and serving to depress the same independently, substantially as specified.

2. The combination of the lifter hook, the series of harness cords each having an elastic connection with said lifter hook, and journals engaging with said harness cords and serving to depress the same independently and stretch said elastic connections, substantially as specified.

3. The combination of the lifter hook, the series of harness cords, yielding connections between the latter and the lifter hook, and a series of journals each adapted either to independently lift or depress the harness cord controlled by it, substantially as specified.

4. The combination of the lifter hook, the series of harness cords, elastic connections in the form of strips or bands and elastic split eyes serving as connections for said bands, substantially as specified.

In testimony whereof I have signed my name to this specification in the presence of two subscribing witnesses.

FRANK A. WOODHEAD.

Witnesses:
    FRANK E. BECHTOLD,
    JOSEPH H. KLEIN.

It is hereby certified that the name of the assignee in Letters Patent No. 510,752, granted December 12, 1893, upon the application of Frank A. Woodhead, of Philadelphia, Pennsylvania, for an improvement in "Warp-Thread-Operating-Mechanism for Looms," was erroneously written and printed "Thomas Hatton," whereas said name should have been written and printed *Thomas Halton;* and that the said Letters Patent should be read with this correction therein that the same may conform to the files and records of the case in the Patent Office.

Signed, countersigned, and sealed this 19th day of December, A. D. 1893.

[SEAL.]

JNO. M. REYNOLDS,
*Assistant Secretary of the Interior.*

Countersigned:
    JOHN S. SEYMOUR,
        *Commissioner of Patents.*